United States Patent
Wang et al.

(10) Patent No.: US 10,019,652 B2
(45) Date of Patent: Jul. 10, 2018

(54) GENERATING A VIRTUAL WORLD TO ASSESS REAL-WORLD VIDEO ANALYSIS PERFORMANCE

(71) Applicant: Xerox Corporation, Norwalk, CT (US)

(72) Inventors: Qiao Wang, Phoenix, AZ (US); Adrien Gaidon, Grenoble (FR); Eleonora Vig, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 97 days.

(21) Appl. No.: 15/051,005

(22) Filed: Feb. 23, 2016

(65) Prior Publication Data
US 2017/0243083 A1 Aug. 24, 2017

(51) Int. Cl.
G06T 19/20 (2011.01)
G06T 17/05 (2011.01)
G06K 9/62 (2006.01)
G06K 9/00 (2006.01)
G06T 7/20 (2017.01)
G06T 19/00 (2011.01)

(52) U.S. Cl.
CPC ........ G06K 9/6262 (2013.01); G06K 9/00711 (2013.01); G06T 7/20 (2013.01); G06T 19/00 (2013.01); G06T 2207/10016 (2013.01); G06T 2207/30236 (2013.01)

(58) Field of Classification Search
CPC .. G06K 9/6262; G06K 9/6256–9/6259; G06T 19/006; G06T 7/246–7/251; G06N 99/005
See application file for complete search history.

(56) References Cited

U.S. PATENT DOCUMENTS

2013/0141574 A1 6/2013 Dalal et al.
2015/0248586 A1 9/2015 Gaidon et al.

OTHER PUBLICATIONS

Taylor et al., "OVVV: Using Virtual Worlds to Design and Evaluate Surveillance Systems", IEEE Publication, copyright 2007, 8 pages total.*
Kanade et al., "Virtualized Reality: Constructing Virtual Worlds from Real Scenes", IEEE MultiMedia, copyright 1997, pp. 34-46.*
Enzweiler et al., "A Mixed Generative-Discriminative Framework for Pedestrian Classification", IEEE publication, copyright 2008, 8 pages total.*

(Continued)

*Primary Examiner* — Brian Werner
(74) *Attorney, Agent, or Firm* — Fay Sharpe LLP

(57) ABSTRACT

A system and method are suited for assessing video performance analysis. A computer graphics engine clones real-world data in a virtual world by decomposing the real-world data into visual components and objects in one or more object categories and populates the virtual world with virtual visual components and virtual objects. A scripting component controls the virtual visual components and the virtual objects in the virtual world based on the set of real-world data. A synthetic clone of the video sequence is generated based on the script controlling the virtual visual components and the virtual objects. The real-world data is compared with the synthetic clone of the video sequence and a transferability of conclusions from the virtual world to the real-world is assessed based on this comparison.

20 Claims, 10 Drawing Sheets

(56) References Cited

OTHER PUBLICATIONS

Bernardin et al., "Evaluating Multiple Object Tracking Performance: The CLEAR MOT Metrics," EURASIP Journal on Image and Video Processing, pp. 1-10 (2008).
Breitenstein, et al., "Online Multi-Person Tracking-by-Detection from a Single, Uncalibrated Camera," IEEE PAMI, vol. 33, No. 9, pp. 1820-1833 (2011).
Broggi, et al., "Model-based validation approaches and matching techniques for automotive vision based pedestrian detection," CVPR Workshops, p. 1-8, (2005).
Butler, et al., "A naturalistic open source movie for optical flow evaluation," ECCV, Part VI, LNCS 7577, pp. 611-625 (2012).
Chen, et al., "DeepDriving: Learning affordance for direct perception in autonomous driving," Technical report, 2015, arXiv:1505.00256, pp. 1-9 (2015).
Collins, et al., "Hybrid Stochastic/Deterministic Optimization for Tracking Sports Players and Pedestrians," ECCV, pp. 1-16 (2014).
Deng, et al., "ImageNet: A large-scale hierarchical image database," CVPR, pp. 248-255 (2009).
Gaidon, et al., "Online Domain Adaptation for Multi-Object Tracking," Online Domain Adaptation for Multi-Object Tracking, *arXiv preprint arXiv*:1508.00776, pp. 1-13 (2015).
Geiger, et al., "Are we ready for autonomous driving? The KITTI vision benchmark suite," CVPR, pp. 3354-3361 (2012).
Geiger, et al., "3D Traffic Scene Understanding from Movable Platforms," PAMI, 36:5, pp. 1012-1025 (2014).
U.S. Appl. No. 14/714,505, filed May 18, 2015, A Gaidon, et al.
U.S. Appl. No. 14/505,031, filed Oct. 2, 2014, A. Gaidon, et al.
Girshick, et al., "Rich feature hierarchies for accurate object detection and semantic segmentation," CVPR, pp. 580-587 (2014).
Gretton, et al., "A kernel two-sample test," The Journal of Machine Learning Research (JMLR), vol. 13(1), pp. 723-773 (2012).
Hall, et al., "Online, Real-Time Tracking Using a Category-to-Individual Detector," ECCV, pp. 1-16 (2014).
Hattori, et al., "Learning scene-specific pedestrian detectors without real data," CVPR, pp. 3819-3827 (2015).
Kaneva, et al., "Evaluation of image features using a photorealistic virtual world," ICCV, pp. 2282-2289 (2011).
Marin, et al., "Learning appearance in virtual scenarios for pedestrian detection," CVPR, pp. 137-144 (2010).
Milan, et al., "Continuous Energy Minimization for Multi-Target Tracking," PAMI, vol. 36, No. 1, pp. 58-72 (2014).
Pirsiavash, et al., "Globally-optimal greedy algorithms for tracking a variable number of objects," CVPR, pp. 1201-1208 (2011).
Stark, et al., "Back to the future: Learning shape models from 3D CAD data," BMVC, vol. 2, No. 4, p. 1-11 (2010).
Vaudrey, et al., "Differences between stereo and motion behaviour on synthetic and real-world stereo sequences," Image and Vision Computing New Zealand, (IVCNZ), pp. 1-6 (2008).
Vázquez, et al., "Virtual and real world adaptation for pedestrian detection," IEEE Transactions on Pattern Analysis and Machine Intelligence (PAMI), vol. 36 (4), pp. 797-809 (2014).
Vázquez, et al., "Unsupervised domain adaptation of virtual and real worlds for pedestrian detection," ICPR, pp. 3492-3495 (2012).
Weinzaepfel, et al., "DeepFlow: Large displacement optical flow with deep matching," ICCV, pp. 1385-1392, (2013).

\* cited by examiner

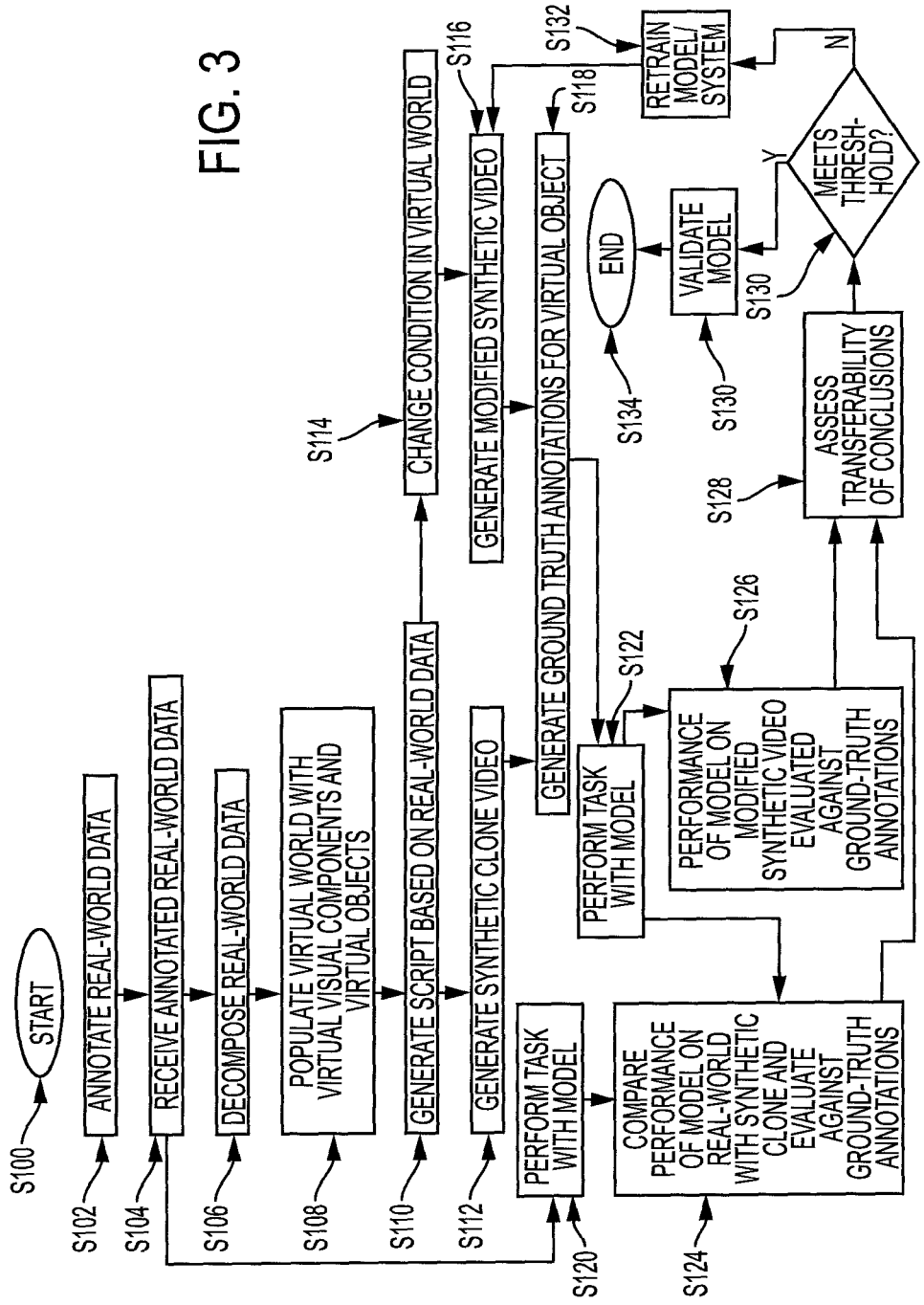

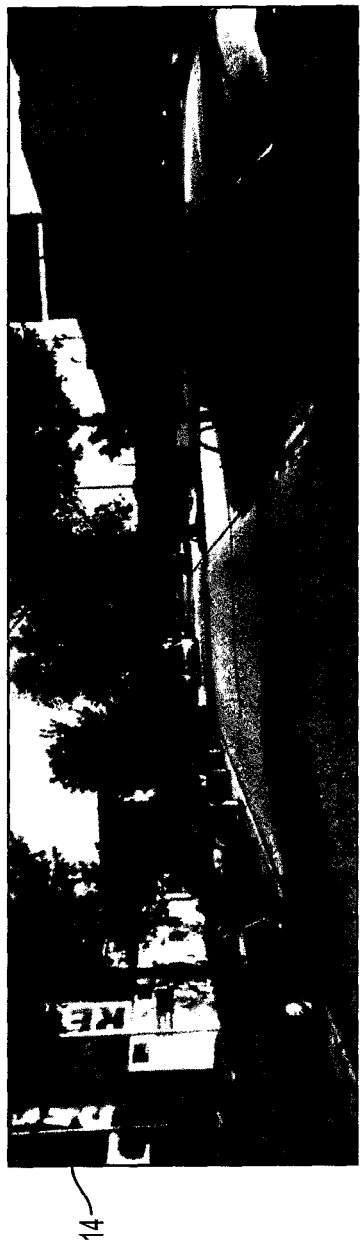

GENERATING A VIRTUAL WORLD TO ASSESS REAL-WORLD VIDEO ANALYSIS PERFORMANCE

BACKGROUND

The exemplary embodiment relates to video analysis and finds particular application in connection with a system and method for initialization of virtual worlds based on real-world data. The system and method find application in Multi-Object Tracking (MOT), which entails automatically detecting and tracking objects, such as cars, in real-world and synthetic video streams.

Assessing performance on data not seen during training is often used to validate machine learning models. In computer vision, however, experimentally measuring the actual robustness and generalization performance of high-level recognition methods is difficult in practice, especially in video analysis, due to high data acquisition and labeling costs. Furthermore, it is sometimes difficult to acquire data for some test scenarios of interest, such as in inclement weather or for a scene of an accident.

The acquisition of large, varied, representative, unbiased, and accurately labeled visual data often entails complex and careful data acquisition protocols which can raise privacy concerns. In addition, it is time-consuming and requires expensive annotation efforts. Crowdsourcing may be used to obtain the annotations. See, for example, J. Deng, et al., "ImageNet: A large-scale hierarchical image database," Computer Vision and Pattern Recognition (CVPR), pp. 248-255 (2009). For accurate results, this process often has to be done for every task and data source of interest, with little potential for re-usability.

Existing methods of video understanding are particular prone to these challenges, due to the vast amount of data and the complexity of the computer vision tasks of interest (e.g., multi-object tracking or action recognition), which often involve detailed annotations (e.g., tracking of various objects through a sequence of frames). Although cheaper annotation processes, or even omitting annotation all together, might be used during training via weakly-supervised or even unsupervised learning, experimentally evaluating model performance entails accurate labeling of large datasets.

These limitations of current video analysis methods are illustrated, for example, by a widely-used multi-object tracking dataset known as KITTI, which is a project of Karlsruhe Institute of Technology and Toyota Technological Institute at Chicago. See, Geiger, et al., "Are we ready for autonomous driving? The KITTI vision benchmark suite," Computer Vision and Pattern Recognition (CVPR), pp. 3354-3361 (2012), hereinafter, "Geiger 2012". The KITTI vision suite contains only 29 test sequences captured in similar good conditions and from a single source. This and other existing datasets in computer vision generally do not contain a sufficient variety of conditions for properly assessing the performance of video analysis algorithms. Varying conditions, e.g., day, night, sun, rain, multiple detailed object class annotations, e.g., persons, cars, license plates, and different camera settings, are some of the factors which affect video analysis and should be considered in assessing algorithms.

The use of synthetic data in computer vision has been evaluated in low-level video analysis tasks, such as optical flow estimation, which entail costly pixel-level annotations. One example of using computer-generated videos to benchmark low-level vision algorithms is described in D. J. Butler, et al., "A naturalistic open source movie for optical flow evaluation," ECCV, Part VI, LNCS 7577, pp. 611-625, 2012, hereinafter, "Butler 2012". In practice, however, the use of synthetic data in existing computer vision methods faces two major limitations. First, data generation is itself costly, as it entails creating an animated video from scratch. In addition to the financial costs, the expertise and time involved in making such videos does not allow the creation of large amounts of data. This makes it difficult to generate specific scenes at the request of a client to test a particular scenario of interest. Recording scenes from humans playing video games is an alternative approach, but this approach also faces similar time costs and also limits the variety of scenes. See, e.g., J. Marín, et al., "Learning appearance in virtual scenarios for pedestrian detection," Computer Vision and Pattern Recognition (CVPR), pp. 137-144, 2010, hereinafter, "Marín 2010".

The second limitation of existing approaches for generating and using synthetic data in video analysis lies in its usefulness as a proxy to assess real-world video analysis performance. Existing synthetic datasets often include both a particular training set and test set, thus only allowing the assessment of performance in that particular virtual world. In addition, previous studies have indicated that existing computer graphics techniques do not ensure that low-level computer vision algorithms performing well in virtual worlds would also perform well on real-world sequences. See, e.g., T. Vaudrey, et al., "Differences between stereo and motion behaviour on synthetic and real-world stereo sequences," Image and Vision Computing New Zealand, (IVCNZ), pp. 1-6, 2008.

Some existing computer vision approaches have used synthetic images for training data augmentation. These existing approaches are mainly limited to using rough synthetic models or synthesized real examples for learning. See, e.g., the following models for pedestrian detection: A. Broggi, et al., "Model-based validation approaches and matching techniques for automotive vision based pedestrian detection," CVPR Workshops, p. 1, 2005; M. Stark, et al., "Back to the future: Learning shape models from 3D CAD data," BMVC, Vol. 2, No. 4, p. 5, 2010; Marín 2010; and D. Vázquez, et al., "Unsupervised domain adaptation of virtual and real worlds for pedestrian detection," ICPR, pp. 3492-3495, 2012.

Recent approaches have attempted to study whether appearance models of pedestrians in a virtual world can be learned and used for detection in the real world. See, e.g., D. Vázquez, et al., "Virtual and real world adaptation for pedestrian detection," IEEE Trans. on Pattern Analysis and Machine Intelligence (PAMI), 36 (4), 797-809, 2014; and H. Hattori, et al., "Learning scene-specific pedestrian detectors without real data," CVPR, pp. 3819-3827, 2015, which aimed to learn high-quality pedestrian detectors without real data. However, the learned detectors are scene and scene-location specific. In practice, this method is limited to a fixed camera, and involves knowledge of the scene geometry and camera calibration parameters.

Photo-realistic imagery has been used for evaluation purposes, but in most cases, the end-task was low-level image and video processing. One approach evaluated low level image features. See, B. Kaneva, et al., "Evaluation of image features using a photorealistic virtual world," ICCV, pp. 2282-2289, 2011. Another work proposed a synthetic dataset for optical flow estimation. See, Butler 2012. Photo-realistic imagery has been used for basic building blocks of autonomous driving. See, Chenyi Chen, et al., "DeepDriving: Learning affordance for direct perception in autonomous driving," Technical Report, 2015. These approaches view photo-realistic imagery as a way of obtaining ground truth that cannot be obtained otherwise (e.g., no sensor can measure optical flow directly). When ground-truth data can be collected, for example, through crowd-sourcing, real-world imagery is favored over synthetic data because of the artifacts the latter may introduce.

The potential of virtual worlds for generating endless quantities of varied video sequences on-the-fly would be especially useful to assess model performance, which is invaluable for real-world deployment of applications relying on computer vision algorithms. Thus, there remains need for the automatic generation of arbitrary photo-realistic video sequences with ground-truths to assess the degree of transferability of experimental conclusions from synthetic data to the real-world.

INCORPORATION BY REFERENCE

The following references, the disclosures of which are incorporated herein by reference in their entireties, are mentioned:

U.S. Ser. No. 14/714,505, filed May 18, 2015, entitled MULTI-OBJECT TRACKING WITH GENERIC OBJECT PROPOSALS, by Adrien Gaidon, et al.

U.S. Ser. No. 14/505,031, filed Oct. 2, 2014, entitled EFFICIENT OBJECT DETECTION WITH PATCH-LEVEL WINDOW PROCESSING, by Adrien Gaidon, et al.

U.S. Pub. No. 20150248586, published Sep. 3, 2015, entitled SELF-LEARNING OBJECT DETECTORS FOR UNLABELED VIDEOS USING MULTI-TASK LEARNING, by Adrien Gaidon, et al.

U.S. Pub. No. 20130141574, published Aug. 19, 2014, entitled VEHICLE OCCUPANCY DETECTION VIA SINGLE BAND INFRARED IMAGING, by Edul N. Dalal, et al.

BRIEF DESCRIPTION

In accordance with one aspect of the exemplary embodiment, a method of assessing video performance analysis includes acquiring a set of real-world data including a video sequence. With a computer graphics engine, the real-world data is cloned in a virtual world, including decomposing the real-world data into visual components and objects in at least one object category, and populating the virtual world with virtual visual components and virtual objects. A script is generated to control the virtual visual components and the virtual objects in the virtual world based on the set of real-world data. A synthetic clone of the video sequence is generated based on the script for controlling the virtual visual components and the virtual objects and a set of ground truth annotations for the virtual objects in the synthetic clone is generated. The real-world data is compared with the synthetic clone of the video sequence and a transferability of conclusions from the virtual world to the real-world is assessed based on the comparison of the real-world data with the synthetic clone of the video sequence.

In accordance with another aspect of the exemplary embodiment, a system for assessing video performance analysis includes a graphics engine component, which for a set of real-world data including a video sequence, clones the real-world data in a virtual world, decomposes the real-world data into visual components and objects in at least one object category, and populates the virtual world with virtual visual components and virtual objects. A scripting component generates a script to control the virtual visual components and the virtual objects in the virtual world based on the set of real-world data and to generate a synthetic clone of the video sequence. A modification component changes a condition of one of the virtual visual components or the virtual objects. An annotation component generates a set of ground truth annotations for the virtual objects. A performance component performs a specific task with an algorithm and assessing a transferability of conclusions based on a performance of the algorithm.

At least one of the computer graphics engine component, the scripting component, the modification component, the annotation component, and the performance component is implemented with a processor.

In accordance with another aspect of the exemplary embodiment, a method of assessing video performance analysis includes acquiring a set of real-world data including a video sequence. With a computer graphics engine, the real-world data is cloned in a virtual world, including decomposing the real-world data into visual components and objects in at least one object category, and populating the virtual world with virtual visual components and virtual objects. A script is generated for controlling the virtual visual components and the virtual objects in the virtual world based on the set of real-world data. A condition of one of the virtual visual components or the virtual objects is changed. A synthetic clone of the video sequence based on the script for controlling the virtual visual components and the virtual objects is generated, and a modified synthetic video based on the changed condition is generated. A set of ground truth annotations for the virtual objects in the synthetic clone and the virtual objects in the modified synthetic video are generated. A specific task is performed with an algorithm on the real-world data, on the synthetic clone of the video sequence, and on the modified synthetic video. A performance of the algorithm is evaluated against the set of ground truth annotations, and a transferability of conclusions from the virtual world to the real-world is assessed based on the performance of the algorithm.

BRIEF DESCRIPTION OF THE DRAWINGS

FIG. 3 is a flow chart illustrating a method for generating virtual worlds to assess real-world video analysis performance in accordance with another aspect of the exemplary embodiment;

FIGS. 4 and 5 illustrate a rendered frame from the synthetic clone of a real-world video from the KITTI dataset and a corresponding frame from the original KITTI video, respectively;

DETAILED DESCRIPTION

Figure 1:
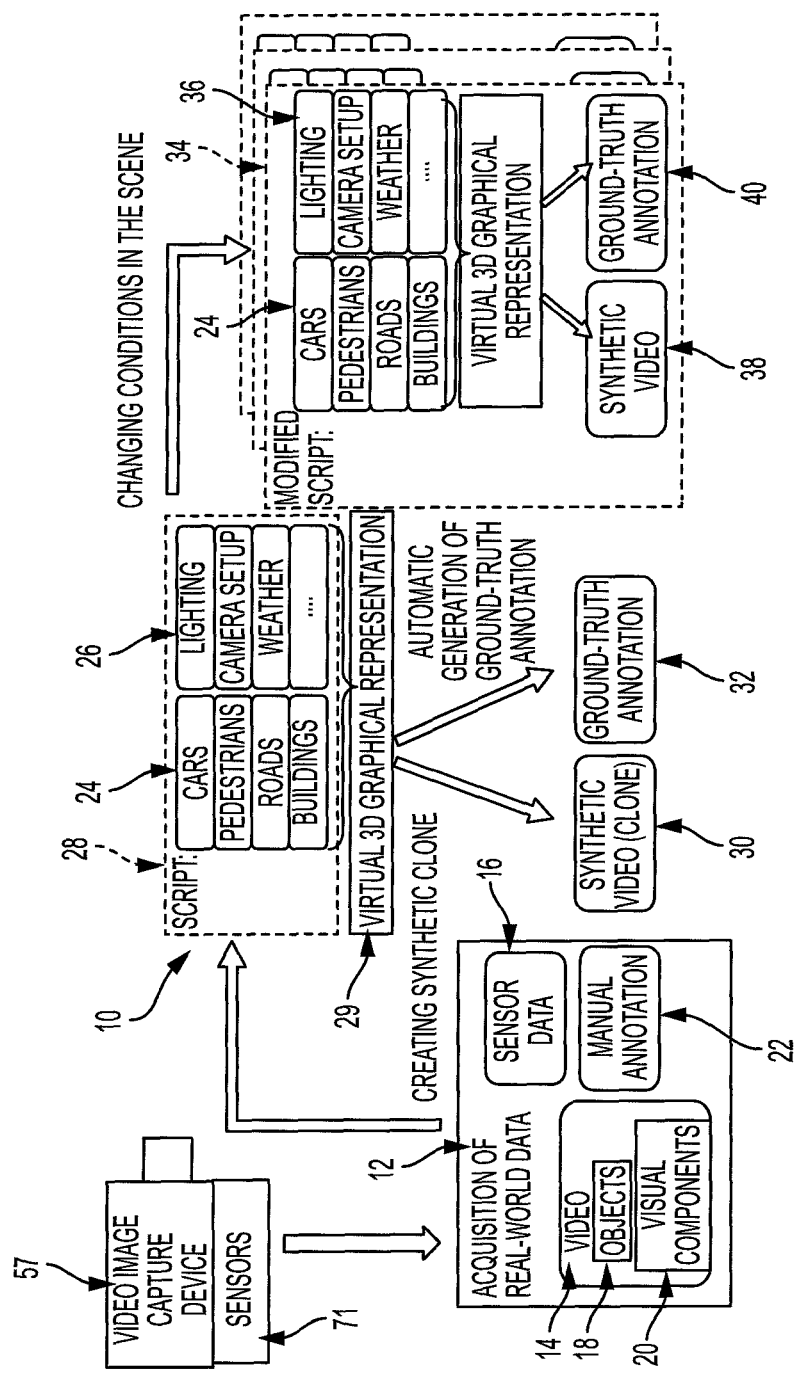
FIG. 1 is an overview of a system and method for generating virtual worlds to assess real-world video analysis performance in accordance with one aspect of the exemplary embodiment.

Aspects of the exemplary embodiment relate to a system and method for generating virtual worlds to assess performance of real-world video analysis. The system and method are suited to generic computer graphic engines, thus enabling the automatic generation of modified synthetic video sequences from which a proxy for real-world performance can be determined.

In various embodiments, the system and method address the problem of real-world video analysis performance in conditions for which there is little or no available data.

Briefly, the method may include acquisition of a limited amount of real-world data as a starting point for calibration, cloning of this real-world data into a virtual world, automatic generation of modified synthetic video sequences, automatic generation of detailed ground truth annotations on the synthetic video sequences, and assessment of the transferability of conclusions derived from the synthetic sequences. Analyses can be performed using the synthetic video sequences to assess performance of a Multi-Object Tracking (MOT) model, for example, in rare or impractical to recreate situations. The method also allows analysis of the impact of single factors, or ceteris paribus analyses, on MOT models.

As used herein, the term "object" refers to an inanimate object (or group of inanimate objects), such as a vehicle, license plate, other article of manufacture, building, or the like, or to an animate object (or group of animate objects), such as a person or group of people, or an animal or group of animals. In particular, the term "object" refers to a physical object that can be imaged by cameras.

Example categories of object include moving/moveable objects, such as motorized and/or non-motorized vehicles (or a specific class of vehicles, e.g., cars or bicycles), animals (or a specific class of animals, e.g., people), etc. Further exemplary categories of objects include stationary objects, such as structures (or a specific class of structures, e.g., buildings or roads), signage (or a specific class of signage, e.g., traffic signs), environmental objects (or a specific class of environmental object, e.g., the sky or trees), etc. While illustrative embodiments describe the detection of cars, it is to be appreciated that other categories are also contemplated.

The term "real-world" refers to actual locations and objects therein, which can be captured with a video camera.

The term "virtual world" refers to a synthetic 3-dimensional representation of the actual locations and objects therein existing in the real world. Although the virtual world is intended to be photo-realistic, it can be visually distinguishable from the real world that it represents.

The term "clone" refers to a synthetic visual representation of a real-world (i.e., acquired by a video camera) video sequence.

The term "script" or "scripting" refers to a description of the components in a scene of a virtual world video sequence. The "script" can describe, for example, categories of objects appearing in the scene, the setup of the environment, the happening of events, and how all of the components in the scene interact with one another.

With reference to FIG. 1, an overview of a system 10 and method for generating virtual worlds to assess real-world video analysis performance is illustrated. The system takes as input a limited amount of real-world data 12, such as a video sequence 14 of images or "frames," and sensor data 16, generated by one or more sensors, which includes a set of physical measurements for relevant objects 18 and visual components 20 in the video sequence. The relevant objects 18 may include, for example, one or more of cars, pedestrians, roads, buildings, and the camera itself. Visual components 20 may include one or more of lighting, weather, and camera setup information. Objects 18 and visual components 20 are manually or otherwise labeled with annotations 22 derived from the sensor data 16. The objects and visual components, along with the annotations 22, are cloned into a virtual world, as shown by virtual objects 24 and virtual visual components 26. The virtual objects and virtual visual components are controlled by script 28 generated by the system 10. Script 28 automatically generates a synthetic or "virtual" video sequence of frames 30, which is a clone of the real world video sequence 14. Annotations 32 are automatically generated for the virtual objects 24 of interest from the corresponding real-world annotations 22. A modified script 34 is generated in response to a changed condition 36 in the script, which may be an on-demand changed condition or a randomly-generated one. The changed condition 36 can relate to any one of the virtual objects 24 or virtual visual components 26, or a combination thereof. The modified script 34 is able to automatically generate a modified synthetic or virtual video 38 based on the changed condition 36. Modified annotations 40 are also generated. The synthetic video clone 30 and its annotations 32 and/or the modified synthetic video 38 and its modified annotations 40, may be output by system 10. Alternatively, the system uses some or all of this information to evaluate the performance of an existing object detection system on virtual data.

Figure 2:
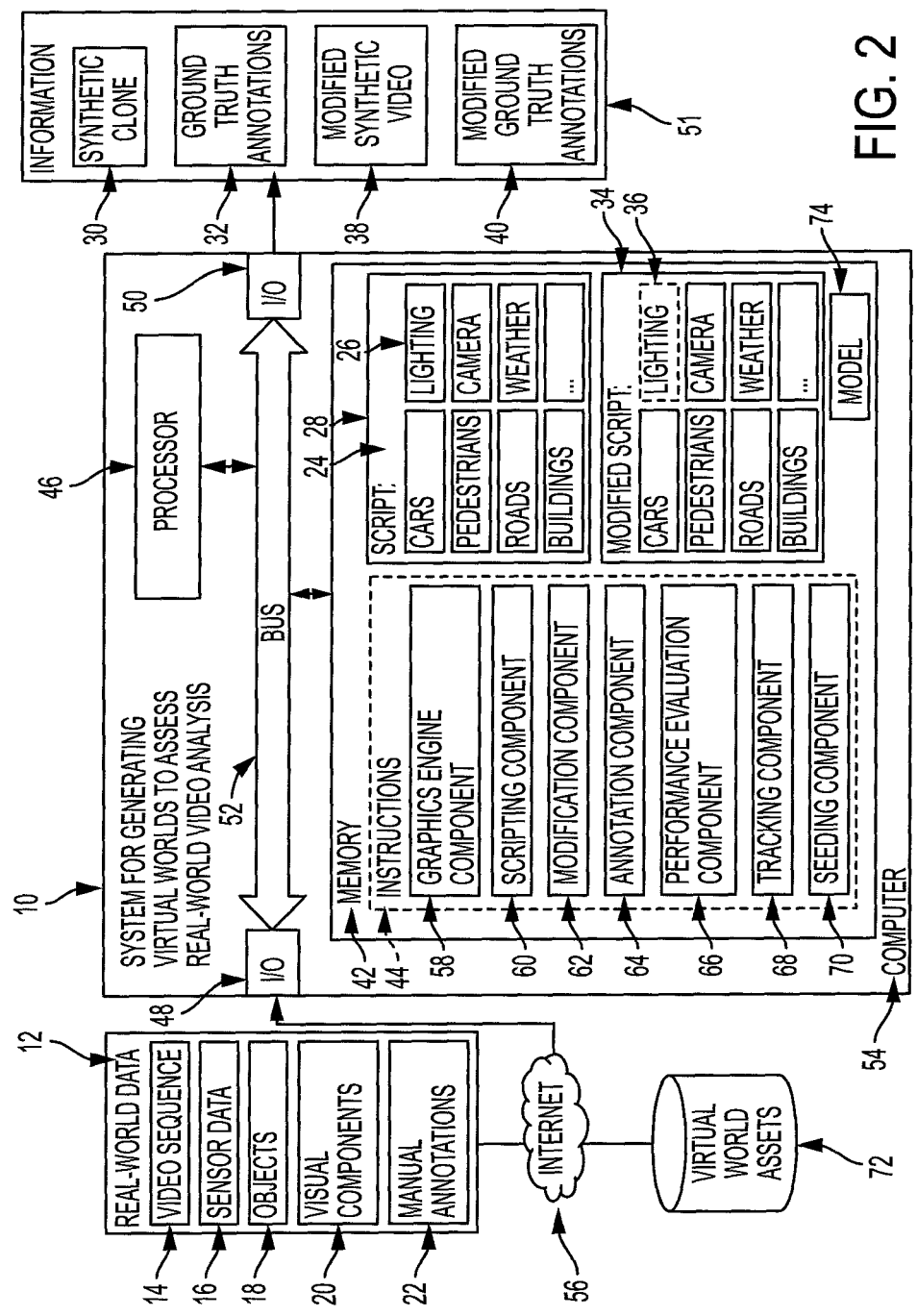
FIG. 2 is a functional block diagram of a system for generating virtual worlds to assess real-world video analysis performance in accordance with another aspect of the exemplary embodiment.

With reference to FIG. 2, a computer implemented system 10 for generating virtual worlds to assess real-world video analysis performance is illustrated. The system 10 includes memory 42, which stores instructions 44 for performing the method described with reference to FIG. 3, and a processor device 46 in communication with the memory for executing the instructions. One or more network input/output (I/O) interfaces 48, 50 are provided for receiving the real-world data 12 and outputting information 51, such as one or more virtual video sequence(s) 30, 38, or information generated therefrom. Hardware components 42, 46, 48, 50 of the system communicate via data control bus 52. The system may be hosted by one or more computing devices, such as the illustrated server computer 54. The system may communicate with external devices or an intermediate server computer, via a wired or wireless network 56, such as a local area network, or a wide area network, such as the Internet.

Video sequences 14 containing a sequence of images or "frames" may be received by the system in any convenient file format, such as JPEG, GIF, GIFV, AVI, Raw video, MPEG, M4V, 3GPP, QuickTime, or the like or other common file format used for videos, and which may optionally be converted to another suitable format prior to processing. Input sequences 14 may be stored in memory 42 during processing. The video sequence can be input from any suitable source 57, such as a workstation, database, memory storage device, such as a disk, video capture device, such as a video camera, or the like. The image acquisition device 57 may also be considered as a sensor that provides sensor data 16, such as camera settings, field of view, and the like.

In general, each frame of the input digital video sequence includes image data for an array of pixels forming the frame. The image data may include colorant values, such as grayscale values, for each of a set of color separations, such as L*a*b* or RGB, or be expressed in another color space in which different colors can be represented. In general, "grayscale" refers to the optical density value of any single color channel, however expressed (L*a*b*, RGB, YCbCr, etc.).

The word "color" is used to refer to any aspect of color which may be specified, including, but not limited to, absolute color values, such as hue, chroma, and lightness, and relative color values, such as differences in hue, chroma, and lightness. The term color may also be applied for video sequences in which the image data falls, at least in part, outside the visible range of the spectrum (400 nm-700 nm), e.g., in the ultraviolet (10 nm-400 nm, e.g., under 350 nm) or infra-red (700 nm-100 μm, e.g., over 1 μm) regions of the spectrum.

The exemplary software instructions 44 include a graphics engine component 58, a scripting component 60, a modification component 62, an annotation component 64, a performance component 66, a tracking component 68, and a seeding component 70.

The seeding component 70 is used in an off-line phase to annotate the real-world data 12 with manual annotations 22 so that the graphics engine component 58 can initialize the virtual world. The objects 18 and various visual components 20 of the real-world dataset 12 may be labeled with the manual annotations 22. Physical measurements 16 from a sensor 71 are included in the annotations 22, such as positions, orientations, sizes, types, colors, etc., for the objects of interest. Sensors 71 providing the data 16 may include one or more of a Global Positioning System (GPS), an inertia measurement unit (IMU), cameras, depth sensors, and human annotators. Existing databases may also be employed in combination with the sensor data, such as manufacturer databases that provide car dimensions, urban planning department databases that provide building and street data, which can be used to annotate the objects and visual components. The quantity of real-world data available for annotating the real-world data may be limited to a small fixed set of real-world sequences, such as at least 5, or at least 10 sequences, each comprising at least 2 or at least 5 seconds worth of video frames. From each of these real-world sequences, various synthetic video sequences can be generated. The seeding component 70 may be omitted when annotation has been performed elsewhere. In one embodiment, annotation is performed on a separate computing device and the real-world data 12, including manual annotations 22, is input to the computer 54.

The graphics engine component 58 takes as input the real-word data 12, which can be a stream of frames in a video sequence 14, and sensor data 16. The graphics engine 58 clones the real-world data into a virtual world by first decomposing the real-world data into respective visual components 20 and the objects 18, which may belong to selected object categories. The graphics engine 58 then generates script 28 (software instructions) for automating or controlling the visual components and objects in the virtual world. Each virtual world 29 that is generated by the script is a photo-realistic, dynamic 3D graphical representation of the real world location and relevant objects in it. Virtual camera paths in the virtual world are used to generate synthetic video clones of the plurality of the visual components in the real-world data, such as virtual video sequence 30. Existing, reusable, and generic computer graphic engines (e.g., graphics, physics, and rendering engines) and graphic assets (e.g., geometric and material models) can either be purchased or commissioned from third-party sources to generate the virtual world 29, based on the real-world visual components. The graphics engine component 58 then populates the virtual world with virtual visual components 26 and virtual objects 24, which can be stored in a database of virtual world assets 72, for reuse.

The scripting component 60, which may be included as part of graphics engine component 58, provides for the scripting, into the virtual world, of the virtual scene components including virtual visual components 26 and the virtual objects 24, based on the real-world data, to generate the synthetic video clone 30. The scripting component advantageously permits the automatic control and scripting of most virtual scene components (e.g., the placement and movement of the camera and some of the virtual objects). The virtual scene components 24, 26, are seeded from the real-world data due to the annotations 22 including sensor data 16 (e.g., GPS, IMU) or by visually aligning the virtual scene components with the real-world video sequence 14. Combined with the recent progress in photo-realistic computer graphics, this real-to-virtual procedure allows for the creation of synthetic data closer to real-world conditions, in both appearance and motion. An example of a frame of the synthetic clone 30 is shown in FIG. 5, where the similarity in appearance between the real-world video 14 in FIG. 4 and the synthetic counterpart 30 in FIG. 5 can be seen. While these frames are shown in monochrome for ease of illustration, it is to be appreciated that the frames may be in color. Due to the difference in computer graphics, some objects, e.g., the vehicles, may be rendered with a higher degree of realism than the buildings, especially if the videos are intended to be used for tracking automobiles. In practice, some virtual scene components may be set or corrected manually for higher fidelity or simplicity of scripting (e.g., global factors like lighting sources).

The modification component 62, which may also be included as part of graphics engine component 58, changes a condition 36 of one of the virtual scene components 24, 26 in script 28 to generate modified script 34. Since the synthetic output of the system 10 is determined by all the components scripted by the scripting component 60, multiple synthetic videos, such as modified synthetic video 38, can be automatically generated by changing one or more conditions in the 3D virtual world 29 with the modification component. This modification can be randomized or modified "on demand" by changing parameters in the scripts 28, or by manually adding, modifying, or removing elements in the scene to generate any number of modified synthetic videos 38. In this regard, the modification component 62 permits the generation of synthetic videos 38 for conditions for which there is no real-world data. In other words, the modified synthetic videos 38 can reflect changes in a condition which does not appear in the real-world video sequence 14 or its synthetic clone 30. As a result, the modification component provides the capability to study quantitatively the impact of single factors ("ceteris paribus analysis") or groups of factors, and the impact of rare events or difficult to observe conditions that might occur in practice ("what-if analysis").

Figure 6:
FIG. 6 illustrates automatic ground truth annotation with the normal rendering of the scene, FIG. 8, the rendering of the same scene with one object changed to black and in FIG. 10 to white.
Figure 7:
FIG. 7 shows a raw pixel-level ground truth annotation, FIG. 9, a refined pixel-level ground truth annotation, FIG. 11, a 2D bounding box for the annotated object.
Figure 8:
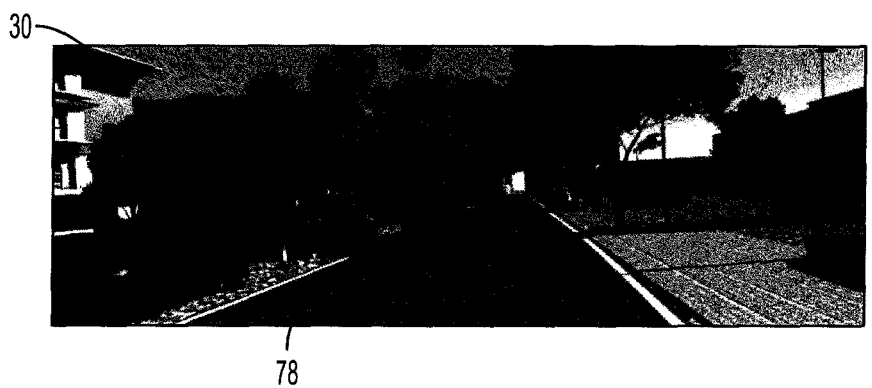
Figure 9:
Figure 10:
Figure 11:

The annotation component 64 generates pixel-level annotations 32, 40 for each virtual object of interest in the virtual video sequences 30, 38, including the synthetic clone 30 and the modified synthetic video 38. If the virtual object of primary interest is a car, for example, algorithm-based ground-truth annotations can be automatically generated for each car appearing in synthetic video output 30, 38. To achieve this, the annotation component 64 generates the pixel-level ground-truth annotations by changing the material properties (e.g., color) of each virtual object to be annotated and comparing the new graphic output with the original one, pixel-by-pixel. FIGS. 6-10 illustrate the generation of pixel-level ground truth annotations by the annotation component 64 with reference to the synthetic clone video 30. FIG. 6 shows a frame of a synthetic clone video 30 with a normal image of vehicle 76 appearing in the middle of the frame. FIG. 8 shows the frame of the synthetic clone video 30 where an additional image 78 of the vehicle is rendered with its material color changed to plain black. FIG. 10 shows another image 80 of the vehicle in a frame of the synthetic video 30 with its material color modified to plain white. The annotation component 64 then compares the frames illustrated in FIGS. 6, 8, and 10 pixel by pixel to generate raw pixel-level annotations 32, as shown in FIG. 7. The raw pixel level annotations 32 can be refined by using morphological operations (e.g., erosion, dilation, etc.) to remove spurious pixels, as shown in FIG. 9. The annotation component 64 then aggregates the refined pixel-level annotations 32 to obtain a 2D bounding box 82 for each object (FIG. 11), which is the smallest rectangle, or other suitable regular shape, that encompasses pixels annotated as being part of the object. Pixel-level ground truth annotations 40 are generated for modified synthetic videos 38 in the same way. The 2D bounding box ground-truth annotations are useful in training and testing purposes as further discussed below.

The performance component 66 is utilized to evaluate the usefulness of the synthetic generated data 30, 32, 38, and 40 for specific analysis tasks. A measure of the transferability of conclusions from the virtual world to the real-world can be determined, based on the results output by the performance component. In some embodiments, the performance component assesses usefulness based on the performance of a model 74 in performing a task, such as identifying a sequence of frames which contain the same object and the location of that object in each of the frames. Performance may be evaluated based on one or a plurality of metrics designed to measure the model's ability to perform the designated task. In some embodiments, the performance of a task-specific model 74 is evaluated against the ground-truth annotations 32, 40 as described in further detail below.

In some embodiments, the model 74 is a tracking model configured for multiple-object tracking (MOT). The tracking model is trained to track real-world objects 18 in a video sequence, such as sequence 14. Virtual objects 24 in the synthetic clone 30 and virtual objects in the modified synthetic video 38 may be tracked with the same model 74. By comparing the performance of an algorithm on the generated synthetic data, the performance component 66 quantifies whether using photo-realistic synthetic videos 30, 38 is a valid proxy for conducting real-world analyses of computer vision algorithms such as MOT models. In addition, the results of performance component 66 may be used to determine which factors in the system 10 may need improvement, including the tools used (e.g., graphics, physics measurement, and rendering engines), and the quality of implementation (e.g., the degree of photorealism and details of environments and object designs or animations), for the target analysis tasks.

In some embodiments, the system 10 can include a tracking component 68 when the specific analysis task is single object tracking or multi-object tracking (MOT). The tracking component 68 utilizes the model 74 to detect and track real-world objects 18 in the video sequence 14, virtual objects 24 in the synthetic clone 30, and virtual objects in the modified synthetic video 38. Any suitable tracking model can be used in connection with the present disclosure, such as the ODAMOT tracker described by A. Gaidon, et al., "Online domain adaptation for multi-object tracking," BMVC, 2015, hereinafter, "Gaidon 2015," and in U.S. Ser. No. 14/714,505, or tracking-by-detection (TBD) described by A Geiger, et al., "3D Traffic Scene Understanding from Movable Platforms," PAMI, 36:5, pp. 1012-1025 (2014), hereinafter, "Geiger 2014". The performance of the tracking component 68 in the virtual world can then be assessed by the performance component 66, and a measure of transferability of conclusions to the real-world can be determined. For example, degree of overlap of object bounding boxes in the corresponding frames of real world and virtual video frames can be determined as a measure of transferability.

The system 10 may be resident on one or more computing devices 54, such as a PC, such as a desktop, a laptop, palmtop computer, portable digital assistant (PDA), server computer, cellular telephone, tablet computer, pager, combination thereof, or other computing device capable of executing instructions for performing the exemplary method. As will be appreciated parts of the system 10 may be distributed over two or more computing devices.

The memory 42 may represent any type of non-transitory computer readable medium such as random access memory (RAM), read only memory (ROM), magnetic disk or tape, optical disk, flash memory, or holographic memory. In one embodiment, the memory 42 comprises a combination of random access memory and read only memory. In some embodiments, the processor 46 and memory 42 may be combined in a single chip.

The network interface 48, 50 allows the computer 54 to communicate with other devices via a wired or wireless link, such as a computer network, such as a local area network (LAN) or wide area network (WAN), or the Internet, and may comprise a modulator/demodulator (MODEM) a router, a cable, and and/or Ethernet port.

The digital processor 46 can be variously embodied, such as by a single-core processor, a dual-core processor (or more generally by a multiple-core processor), a digital processor and cooperating math coprocessor, a digital controller, or the like. The digital processor 46, in addition to controlling the operation of the computer 54, executes instructions stored in memory 42 for performing the method outlined in FIG. 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

With reference now to FIG. 3, a method for generating virtual worlds to assess real-world video analysis performance, which can be performed with the system of claim 2, is illustrated. The method begins at S100.

At S102, which can be performed in an off-line phase, real-world dataset 12 is annotated. Objects of interest (e.g., cars or pedestrians) are annotated with sensor data 16 such as physical measurements and data from existing databases. A previously-generated real-world dataset, such as the KITTI dataset, may be utilized, which includes data captured from a driving car using gray scale and color cameras, 3D laser scanners, and IMU and GPS sensors.

In the on-line phase, the following procedure may be implemented whenever a dataset is annotated.

At S104, annotated real-world data 12 is received and may be stored in memory 42.

At S106, the real-world data 12 is cloned into a virtual world by decomposing into visual components 20 and objects 18, including labeling the objects 18 with a respective object category.

At S108, the virtual world 29 is populated with virtual visual components 26 and virtual objects 24 from the database of virtual world assets 72. The particular virtual visual components and virtual objects which populate the virtual world are based on the visual components and visual objects which appear in the video sequence 14. For example, when a car appears in video sequence 14, graphics engine component 58 populates the virtual world with a virtual car, which may be similar, in appearance, to the real world car, depending on how accurate the engine 58 is at rendering objects in that category.

At S110, a script 28 is generated for controlling the virtual visual components 26 and virtual objects 24 in the virtual world based on the real-world data. The scripting component 60 automatically generates script 28 of virtual scene components 24, 26. The placement and movement of the camera and some virtual objects is automatic and dictated by real-world data 12. Other virtual objects and virtual visual components, such as background objects or lighting sources, may be created and adjusted manually.

At S112 a synthetic video clone sequence 30 is generated by graphics engine component 58 and scripting component 60 in the virtual world based on the script 28.

At S114, a condition 36 of at least one of the virtual scene components 24, 26 is changed with modification component 62, which generates modified script 34. Positions, orientations, trajectories, sizes, colors, or shapes of the virtual objects can thus be changed in modified script 34. In addition, virtual visual components such as lighting or weather conditions can be changed. Furthermore, virtual objects can be manually added, modified or removed.

At S116 a modified synthetic video 38 is generated by graphics engine component 58 and scripting component 60 in the virtual world based on the modified script 34.

At S118, a set of pixel-level ground truth annotations 32, 40 is generated by the annotation component 64 for the virtual objects 24 in synthetic clone 30 and/or modified synthetic video 38.

At S120, a model 74 is used to perform a specific task on the real-world data 12.

At S122, the same model 74 performs the same specific task on the generated synthetic data 30 and/or 38.

At S124, the performance of model 74 on the specific task on real-world data 12 is compared with the performance of the model on the same specific task on generated synthetic data 30. The performance of the model 74 is evaluated against the ground-truth annotations 32 generated in step S118.

At S126, the performance of the same model 74 on the specific task on the generated synthetic data 38 is evaluated against the ground-truth annotations 40 generated in step S118.

At S128, a measure of transferability of conclusions is computed based on the comparison at method step S124 and the evaluation at method step S126.

At S130, if the measure of transferability meets a predefined threshold, the model 74 may be validated for use on synthetic data and/or the virtual video 30 and/or script 28 validated for use with the model (S132). The model 74 and/or synthetic videos may be output and/or applied to other synthetic data 38, to evaluate the model's suitability for use in more different conditions. If the threshold is not met, the model 74 may be retrained to improve operation of the model in the new different conditions in the real world and/or the script may be modified to improve the synthetic clone video or modified synthetic video (S112, S116).

The method ends at S134. The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 54, (for example, an internal hard drive of RAM), or may be separate (for example, an external hard drive operatively connected with the computer 54), or may be separate and accessed via a digital data network such as a local area network (LAN) or the Internet (for example, as a redundant array of inexpensive of independent disks (RAID) or other network server storage that is indirectly accessed by the computer 54, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method.

As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further exemplary aspects of the method and system will now be described.

Acquisition of Real-World Data (S104)

The method to assess video analysis performance on virtual worlds first includes the acquisition of a limited amount of real-world data 12 for the purpose of calibration. The real-world data 12 is used both to initialize the virtual world and for comparison of tested algorithms, such as Multi-Object Tracking (MOT). With respect to initializing the virtual world, the quantity of data required by the method is advantageously smaller than what is typically needed for training or validating current computer vision models. The method does not require a reasonable coverage of all possible scenarios of interest. Instead, a small, fixed set of core real-world video sequences 14 of objects 18 and visual components 20 is used as initial seed data from which a synthetic clone 30 and many modified synthetic or virtual video sequences 38 can be generated, such as at least 2, at least 5, at least 10, or more modified synthetic video sequences 38.

The real-world data 12 acquired for the method may include two general types: videos of real-world scenes obtained from a camera device 57 and physical measurements of significant objects in the scene, including the camera itself. Various sensors 16 are used to capture this data, such as monochrome, color, and/or infrared/UV cameras, 3D laser scanners, inertia measurement units (IMU) and global positioning systems (GPS). In order to for the real-world data 12 to provide a "seed" from which the virtual would can be initialized, the objects 18 appearing in the scenes 14 are manually annotated 22 with the physical measurements from the aforementioned sensors. For example, human annotators may label 3D bounding boxes on several types of objects which may be of interest, including cars and pedestrians. If vehicles are the objects of interest, the annotation data includes information about the positions and sizes of cars and their rotation angles about the vertical axis (yaw rotation). The movement of the camera itself is also recorded. The GPS sensor 71 can measure latitude, longitude, and altitude of the camera, while the orientation (i.e., roll, pitch, yaw) of the camera is measured via a GPS/IMU sensor, which has a fixed spatial relationship with the camera.

For using the real-world data 12 for comparison of the performance of algorithms such as MOT, 2D bounding boxes or windows analogous to bounding boxes 82 (FIG. 11) can be manually annotated for each object of interest (cars, pedestrians, etc.) appearing in video sequence 14.

Cloning of Real-world Data into a Virtual World (S106-S112)

The annotated real-world data 12 discussed above initializes the generation of photo-realistic, dynamic 3D worlds in which virtual camera paths translate into synthetic video clones 30 and modified virtual video sequences 38. This real-to-virtual method allows for considerable computational savings as the virtual world does not need to be built from scratch. Graphics engine 58 decomposes the real-world video sequences 14 into objects 18 and visual components 20. Any suitable existing, reusable and generic computer graphic engine and graphic assets can be used or customized to generate the virtual world.

A generic graphics engine 58 may be modified to include additional components useful in generating the virtual world. These additional components generally include one or more of a rendering engine for generating 2D or 3D models containing geometry, viewpoint, texture, lighting, and/or shading information as descriptions of the virtual scene; a physics engine for providing a realistic sense of the laws of physics, such as rigid body dynamics including collision detection, soft body dynamics, and fluid dynamics; an audio engine for generating realistic sound; artificial intelligence, and the like.

The set of graphic assets 72 may be a pre-existing database which stores 3D models and texture maps of different virtual objects 24 and their materials. Graphic assets 72 are utilized by the graphics engine 58 to populate the virtual world with any number of 3D models for humans, animals, environments, landscapes, trees, plants, structures, buildings, cars, etc., that may appear in the real-world. Virtual objects similar to the real-world objects 18 are chosen so that the virtual world visually resembles the real-world. For example, in parts of North America, 3D models for several deciduous trees in winter and summer foliage could be extensively employed, while for other parts, more tropical plants may be more suitable. The trees selected, in turn, may influence the lighting conditions in the scene. The graphics engine 58 then automatically populates the virtual world with virtual objects 24 based on the real-world seed data. For example, the positions and orientations of cars in the 3D virtual world are calculated based on their positions and orientations relative to the real-world camera and the positions and orientations of the camera itself. Similarly, the road on which a car is driving in the real-world video sequence 14 is placed in the virtual world according to the position of the camera. Most virtual scene components can be automatically controlled and scripted with scripting component 60 using real-world data 12 as input. Minor manual adjustments can be made in special cases, such as the car changing lane or the road changing width.

Some background objects, such as trees and buildings, may be manually positioned in the virtual world for simplicity or due to the lack of position data on them. In addition, the scripting component 60 permits some virtual scene components to be set or corrected manually for higher fidelity or simplicity of scripting (e.g., global factors like lighting sources). Other external data sources may also be used to further automate this process. For example, Google Street View can be used to create similar streets and background objects in the virtual world. The scripting component 60 then automates this virtual world with script 28 to generate the synthetic clone 30 whose appearance resembles that of the real world video. This resemblance can be observed in FIGS. 4 and 5.

Generating Modified Synthetic Sequences (S114-S116)

The modification component 64 makes it possible to change one or more condition 36 in the virtual world that was not previously observed in the real world or modify its synthetic clone generated in S106-S112. Changes to properties of virtual objects 24 and virtual visual components 26 in the script 28 results in modified script 34. Exemplary changed conditions 36 include a change in direction or intensity of lighting, a change in weather, and/or a change in camera setup. These conditions can be randomized or modified on demand with the modification component 64 to achieve flexible, full control of the data generation pipeline and generate limitless variety and quantity of virtual scenes. These simple changes made with the modification component 64 translate to complex visual changes that would otherwise require the costly process of re-acquiring and re-annotating real-world data.

A number of different visual changes can be achieved with the modification component 64. For example, the lighting may be altered by changing the direction and intensity of the directional light source and/or by reducing or increasing the ambient light intensity. Modifications of this type can be used, for example, to simulate a dusk scene, in which the sun is in the west and objects look dimmer than in a real word sequence that was captured at mid-day. In another modification, the lighting is modified to use a very weak directional light source simulating overcast weather. The weather condition may also be changed in the modified script 34 causing the graphics engine 58 to generate the effect of fog or rain. In another modification, the camera position may be moved down from its original position.

Other conditions that may be changed with modification component 42 include one or more of: the number, trajectories, and speeds of objects (e.g., cars); their sizes, colors, or shapes; the camera position, orientation, and trajectory; the presence/absence of some events (e.g., accidents); and combinations thereof.

The ability to generate modified virtual video sequences 38 having any number of changed conditions allows questions to be answered about the performance of a model 74 in certain scenarios for which there is no real-world data. In the case of MOT, one factor can be changed at a time to perform an "all other things being equal" or "ceteris paribus" analysis. For example, fog can be generated with all other conditions of the scene remaining the same. Tracking performance is then analyzed with this changed condition. Virtual video sequences with rare or impractical situations can also be generated to measure the performance of a model in a "what-if" analysis. Examples of rare or impractical situations suitable for a "what-if" analysis include "what if there is an accident" or "what if a pedestrian appears." Tracking performance is then analyzed with this changed condition.

Generation of Ground Truth Annotations on Synthetic Sequences (S118)

The generation of ground truth annotations 32, 40 on the synthetic videos 30, 38 may be achieved automatically using an algorithm-based approach which allows richer (i.e., pixel-level) and more consistent results than those from human annotators. Ground truth annotations represent the ideal output of system 10 when utilized to perform a task. For a task such as MOT, the ideal output or goal is the identification of every object of interest in the scene, whether it be the real-world video sequence 14 or one of the synthetic video sequences 30, 38.

To achieve the pixel-level ground truths, the annotation component 64 may render each moment or frame of virtual scene 30, 38 multiple times. All scene components are kept the same for each rendering, except the material of one virtual object of interest is changed (an object whose ground truth needs to be annotated). The first instance of the virtual object appearing in the virtual video constitutes an original or normal image or rendering 76 of the virtual object (e.g., car), such as image in FIG. 6. Two additional images 78, 80 are then rendered for the virtual object, with its material color changed to plain black FIG. 8) and then plain white (FIG. 10). The three images (the normal rendering and two additional ones with different material colors) are compared pixel by pixel to generate raw pixel-level ground-truth 32, 40 for that particular virtual object.

Figure 13:
FIG. 13 shows a corresponding clone of the video frame.
Figure 14:
FIG. 14 shows pixel level annotations of the vehicles in the clone frame.

This process is repeated for each virtual object of interest in the scene until a raw pixel-level ground truth has been generated for each virtual object in the scene. For an image with several objects of interest, such as several cars in a frame (FIG. 12), the automatic ground-truth annotation 32 for a synthetic clone 30 (FIG. 13) or modified video sequence may be generated and displayed in different colors (they all appear grey in the monochrome rendering shown in FIG. 14). The raw pixel level annotations can be refined by using morphological operations (e.g., erosion, dilation, etc.) to remove spurious pixels. Bounding boxes 82, as seen in the lower right image of FIG. 5, are generated by aggregating the optionally-refined pixel-level ground-truth annotations for the virtual object of interest. Ground-truth annotations 32, 40 are utilized in subsequent steps to evaluate performance of a task-specific algorithm 74, as described in more detail below.

Assessing Transferability of Conclusions (S120-128)

In this step, the usefulness of the generated synthetic data 30, 32, 38, and 40 is assessed by the performance component 66 for specific analysis tasks, such as MOT. The performance of specific analysis tasks is compared with the ground-truth annotations 32, 40, which represent the ideal output of the system. In particular, the performance component 66 assesses whether the virtual world is a good proxy for the real-world, and quantifies how good of a proxy the virtual world is.

In some embodiments, generated synthetic data 30, 32 is analyzed. In this case, the output of the performance component 66 relies on a comparison of the performance of a tested model 74 on the initial "seed" real-world video sequence 14 and its synthetic clone 30. The performance depends on the tasks of interest, such as the multi-object tracking of all objects of interest appearing in a scene. Task-specific metrics are used to evaluate the performance. It is also possible to complement task-specific metrics with more general measures of discrepancy between the outputs on the real videos 14 and the synthetic clones 30. For example, domain mismatch measures like the maximum mean discrepancy (see, A. Gretton, et al., "A kernel two-sample test," J. Machine Learning Res. (JMLR), 13(1): 723-773, 2012) can be computed.

The behavior of a model 74 for achieving a task in the real-world and the behavior of the same model for achieving the same task in the virtual world should match, as closely as possible, according to the performance metric of the task. If the performance component 66 indicates that the behaviors match (e.g., have at least a threshold level of agreement), it is an indication that the virtual world is a good proxy for the real-world, and the model and/or virtual world generating method may be validated (S130). If the performance component 66 indicates a discrepancy in behaviors, the virtual world may still be an adequate proxy for the real-world for some tasks. However, a discrepancy indicates that performance may degrade for the task where the discrepancy exists. In this case, the gap in performance may be learned and quantified.

In some embodiments, generated synthetic data 38, 40 is analyzed. In this case, the output of performance component 66 is the task-specific metrics, which quantitatively measure the impact a changed condition has on the performance of the model 74. In this case, no comparison is made with a real-world video sequence since one does not exist for the changed condition. However, the quantified impact of the changed condition in the virtual world still provides an indication of performance in the real-world. This is because the virtual world is initialized from the synthetic clone 30 of the real-world video sequences. A gap in performance between the clone and the modified version may also be learned and quantified in this embodiment.

In order to narrow the gap in performance, it may be useful to assess the impact of the virtual world design, the degree of photo-realism, and the quality of other rendering parameters on the performance metrics of interest, including the model itself. If modifications to the aforementioned factors fail to narrow the gap in performance, it may be an indication that more real-world data would be beneficial in order to adequately retrain the system 10. This simple and natural technique for assessing performance is a direct benefit of generating the virtual world based on the synthetic cloning of a small set of real-world sensor data.

In some embodiments, the model or algorithm 74 used to assess the transferability of conclusions is one for multi-object tracking (MOT). In MOT, given a video stream and a semantic class, e.g., "car" or "pedestrian," the goal or task is to track individual objects in the class in the frames of the video stream as they move over time. The MOT algorithm is utilized in connection with real-world video sequence 14, synthetic clone 30, and any one of the modified synthetic videos 38 having a changed condition.

Any suitable MOT model 74 can be used in connection with the exemplary method and system disclosed herein. Existing MOT algorithms are described, for example, in Breitenstein, et al., "Online Multi-Person Tracking-by-Detection from a Single, Uncalibrated Camera," IEEE PAMI, 33:9, pp. 1820-1333 (2011); Pirsiavash, et al., "Globally-optimal greedy algorithms for tracking a variable number of objects," CVPR, pp. 1201-1208, 2011; Milan, et al., "Continuous Energy Minimization for Multi-Target Tracking," PAMI, 36:1, pp. 58-72, 2014; Geiger 2014; Hall, et al., "Online, Real-Time Tracking Using a Category-to-Individual Detector," ECCV, 2014; Collins, et al., "Hybrid Stochastic/Deterministic Optimization for Tracking Sports Players and Pedestrians," ECCV, 2014. Tracking-by-detection (TBD) is a standard method for object tracking in monocular video streams. It relies on the observation that an accurate appearance model is enough to reliably track an object in a video.

In particular embodiments, the ODAMOT tracker is used for MOT. See Gaidon 2015. The ODAMOT tracker addresses the problem of tracking multiple objects in videos by using generic object proposals (i.e., predicts locations of the objects). The proposals may be in the form of a list of windows (bounding boxes 78) that are likely to contain any kind of object in the frame. Features are extracted from each proposed object, and the proposal-level predictions are then linked together using a particle filter (one per target) to track the target over the sequence of frames.

After the tracker is finished parsing videos (video sequence 14, synthetic clone 30, and modified synthetic video 38), the ground-truth annotations 22 (manually annotated in S102) 32 (automatically generated for the synthetic clone in S118), 40 (automatically generated for the modified synthetic video in S118) are used to evaluate the performance of the tracker.

Until now, it has not been possible to accurately assess whether using photo-realistic looking synthetic videos is a valid alternative to conducting real-world analyses of computer vision algorithms. Instead of manually generating a fixed set of synthetic videos useful for a specific pre-determined task and domain, see, e.g., the Sintel benchmark (Butler 2012) for optical flow, the exemplary method directly quantifies the usefulness of synthetic videos generated in order to measure the transferability of conclusions from synthetic to real-world data.

In various embodiments disclosed herein, the exemplary method leverages the recent progress in computer graphics (especially off-the-shelf tools like game engines) to generate photo-realistic virtual worlds useful to assess the performance of video analysis algorithms. The system and method described herein have several advantages over existing video analysis techniques, including: low cost of data generation having high-quality detailed annotations; the flexibility to automatically generate rich and varied scenes and their annotations, including under rare conditions to perform "what-if" and "ceteris paribus" analysis; and the ability to quantify the "transferability of conclusions" from synthetic to real-world data.

By initializing the virtual worlds from 3D synthetic clones of real-world video sequences, vast amounts of data with dense detailed labels (e.g., pixel-level annotations in all video frames) can easily be generated. This data is useful both for general performance assessments and model training or fine-tuning. This data is also useful for generating scenes to answer questions about the performance of a model in certain scenarios (e.g., night, rain, snow). In addition, model selection or optimization of hyper-parameters such as very high-level ones that cannot feasibly be tuned automatically otherwise (e.g., optimal camera specifications and camera placement) can be achieved using the generated data.

The method and system may find application, for example, in computer vision technology in the domain of: transportation, such as high-occupancy lane management, vehicle occupancy estimation in parking, license plate recognition, tolling, on-street parking monitoring; healthcare, such as patient monitoring and diagnosis assistance; retail, including product detection, client tracking, waiting time estimation; and business process outsourcing, such as document analysis.

The method described herein quantitatively answers questions and requests without data, which is often not available a priori, and often not even a posteriori, due to privacy concerns or data acquisition costs.

Without intending to limit the scope of the exemplary embodiment, the following examples demonstrate an implementation of the method in the context of transportation. More specifically, the targeted application is the automatic vehicle detection and tracking from a mobile camera.

EXAMPLES

The exemplary method is evaluated in the context of Multi-Object Tracking (MOT). MOT entails automatically detecting and tracking all instances of objects from a known category along the frames of a video stream. This is one of the most useful video analysis tasks for applications in computer vision. The MOT algorithm 74 used to evaluate the exemplary method was the ODAMOT tracker described by Gaidon 2015 and in U.S. application Ser. No. 14/714,505.

Figure 12:
FIG. 12 illustrates a frame of a video with multiple objects of interest, which are annotated with bounding boxes.

Datasets: the exemplary method is evaluated for Multi-Object Tracking (MOT) performance on the publicly available, real-world KITTI dataset. See Geiger 2012. The KITTI dataset is used as the real-world data to initialize a virtual world. This dataset was captured by a camera mounted on a vehicle driving along roads. The sensors used to capture the data include gray-scale and color cameras, a 3D laser scanner, and an inertial and GPS navigation system. From the point of clouds captured by the 3D laser scanner, human annotators labeled 3D bounding boxes of several types of objects including cars and pedestrians (in the present Examples only data for cars was used). The annotation data includes the positions and sizes of cars, and their rotation angles about the vertical axis (yaw rotation). The movement of the camera itself was recorded via GPS (latitude, longitude, altitude) and its orientation (roll, pitch, yaw) via the GPS/IMU sensor, which has a fixed spatial relationship with the cameras. Manual annotations of 2D bounding boxes of objects (cars, pedestrians, etc.) were also collected to evaluate tracking algorithm performances. A frame from the original KITTI videos and its accompanying 2D bounding box annotations are shown in FIG. 12.

The commercial computer graphics engine Unity, which is a cross-platform game engine, developed by Unity Technologies, was used to create a synthetic world that closely resembles the original one in the KITTI recording. A set of "assets" were obtained from Unity's Asset Store, including 3D models and texture maps of different objects and materials. The virtual world is automatically populated with these virtual objects, where the cars' positions and orientations in the 3D virtual world are calculated based on their positions and orientations relative to the camera and the positions and orientations of the camera itself. The road on which the car was driving is placed according to the position of the camera, with minor manual adjustment in special cases such as the car changing lane, the road changing width, etc. Other roads and background objects, such as trees and buildings are manually placed in the virtual world for simplicity and because of a lack of position data of them. A directional light source simulates the sun. Its direction and intensity are set by comparing the shadows in the virtual and real-world scenes. The end result is a virtual world from which synthetic videos are generated and whose appearance resembles that of the real world video recording, as illustrated in FIGS. 4 and 5.

After the 3D virtual world was created, both synthetic clone virtual videos and synthetic videos with changed conditions were generated. The first synthetic video with a changed condition featured a change in the direction and intensity of the directional light source and a reduction in ambient light intensity to simulate a dusk scene, in which the sun was in the west and objects looked dimmer. A second modified synthetic video included the simulation of overcast weather using a very weak directional light source. Next, a virtual video sequence with foggy and rainy weather was generated using the Unity graphics engine. Physics and rendering engines, special effects, and a particle system built-in to the Unity graphics engine were used to simulate rainy conditions. Videos were also generated in which the camera is moved down from its original position by 1 meter and rotated upward an extra 10 degrees. The results from this synthetic video having the new camera position, as well as the new automatically generated annotations were evaluated.

Quantitative Results for MOT

Table 1 shows the MOT tracking performance of the ODAMOT tracker and a standard TBD baseline on the different real-world and virtual KITTI videos, including for the different changed conditions mentioned above.

The KITTI evaluation protocol was followed using the CLEAR MOT metrics. See, K. Bernardin, et al., "Evaluating Multiple Object Tracking Performance: The CLEAR MOT Metrics," EURASIP J. on Image and Video Processing, pp. 1-10, 2008, including MOT Accuracy (MOTA), MOT Precision (MOTP), Fragmentation (FRG), and ID Switches (IDS)—complemented by the Mostly Tracked (MT) and Mostly Lost (ML) ratios, Precision (Prec), Recall (Rec), and False Alarm Rate (FAR). The public evaluation code from the KITTI tracking benchmark is used. See http://kitti.is.tu-e.mpg.de/kitti/devkit_tracking.zip.

Baselines: The tracking-by-detection (TBD) method is used for comparison with the ODAMOT method. TBD is a standard method for object tracking in monocular video streams. It relies on the observation that an accurate appearance model is enough to track an object in a video reliably.

The results in Table 1 show MOT performance on original real-world KITTI ("-R") and virtual world ("-V") videos. The second and fourth rows are on the synthetic clones. The last four rows of results show ODAMOT performance on synthetic videos with modified conditions.

TABLE 1

Quantitative MOT results

| Method | MOTA | MOTP | MT | ML | Rec. | Prec. | FAR | IDS | FRG |
|---|---|---|---|---|---|---|---|---|---|
| | | | % | | | | | | |
| ODAMOT-R | 52.5 | 71.2 | 14.6 | 14.6 | 63.5 | 87.5 | 66.9 | 36 | 53 |
| ODAMOT-V | 44.7 | 70.5 | 8.3 | 20.8 | 56.1 | 87.4 | 61.0 | 11 | 31 |
| TBD-R | 46.1 | 70.6 | 4.2 | 25.0 | 51.3 | 91.6 | 33.5 | 3 | 21 |
| TBD-V | 30.3 | 68.2 | 2.1 | 37.5 | 43.9 | 76.9 | 93.4 | 13 | 37 |
| ODAMOT-V Dusk | 37.1 | 70.7 | 6.3 | 20.8 | 51.0 | 83.1 | 78.1 | 6 | 29 |
| ODAMOT-V Overcast | 36.9 | 70.7 | 4.2 | 14.6 | 52.7 | 81.0 | 92.7 | 12 | 33 |
| ODAMOT-V Rain | 38.8 | 70.5 | 4.2 | 20.8 | 53.5 | 82.3 | 86.1 | 9 | 29 |
| ODAMOT-V Fog | 23.7 | 71.4 | 0.0 | 26.1 | 44.4 | 74.7 | 80.1 | 5 | 14 |

Transferability of conclusions: The results in Table 1 quantify the gap from real-world performance to virtual performance, depending on the method. As MOT methods rely on object detectors pre-trained on real-world data, the virtual world objects are, in practice, harder to detect due to the domain mismatch. This result can be assessed by the consistent drop in recall (Rec.) and Mostly Tracked (MT) metrics. Note that the detector used by both trackers achieves 60.7% Average Precision (AP, the standard metric for object detection) on the real-world video and 58.7% AP on its synthetic clone. This small but significant drop in detection performance yields portions of the ground truth tracks that are unsupported by reliable detections, as shown by the increased Mostly Lost (ML) metric.

Figure 15:
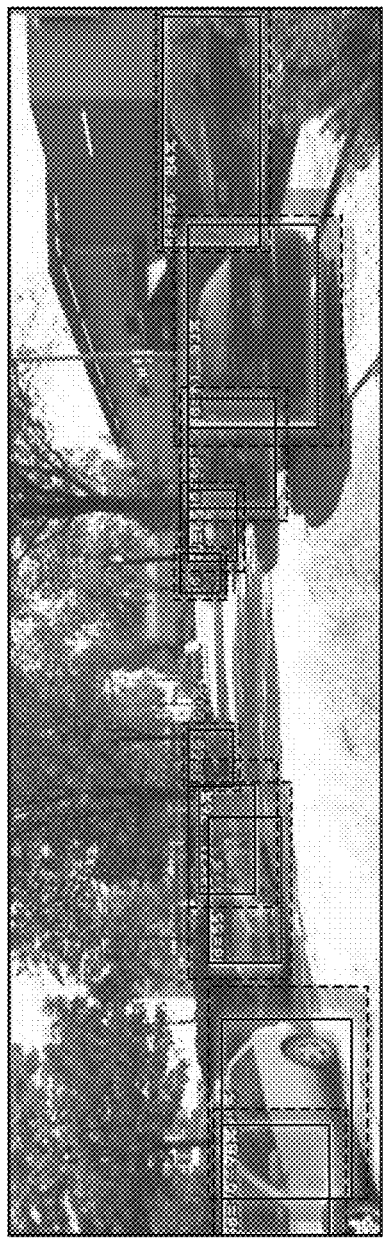
FIG. 15 illustrates the current positions (solid boxes) and predicted tracks (dashed boxes) of the objects (cars) in the original video and FIG. 16 in its synthetic clone computed by MOT tracking.
Figure 16:
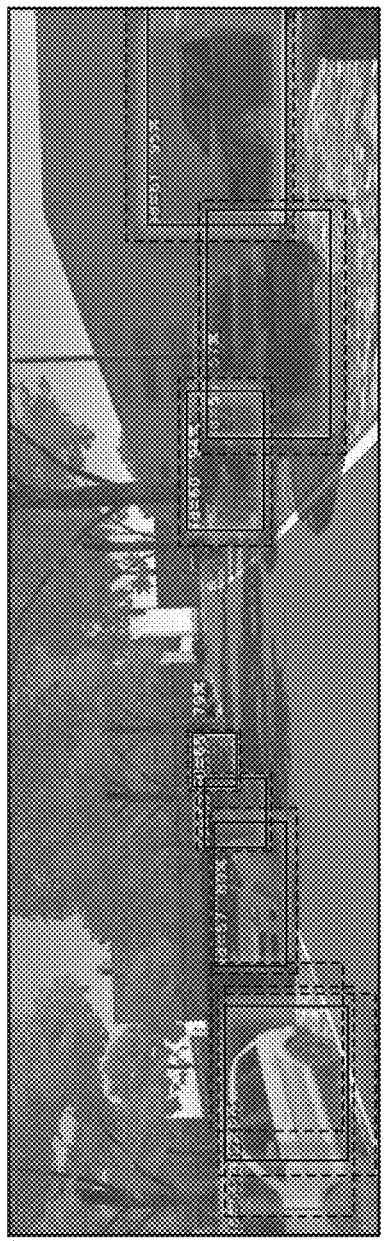
Figure 17:
FIGS. 17-20 illustrate the predicted DeepFlow of matching frames of the original video and its synthetic clone.
Figure 19:
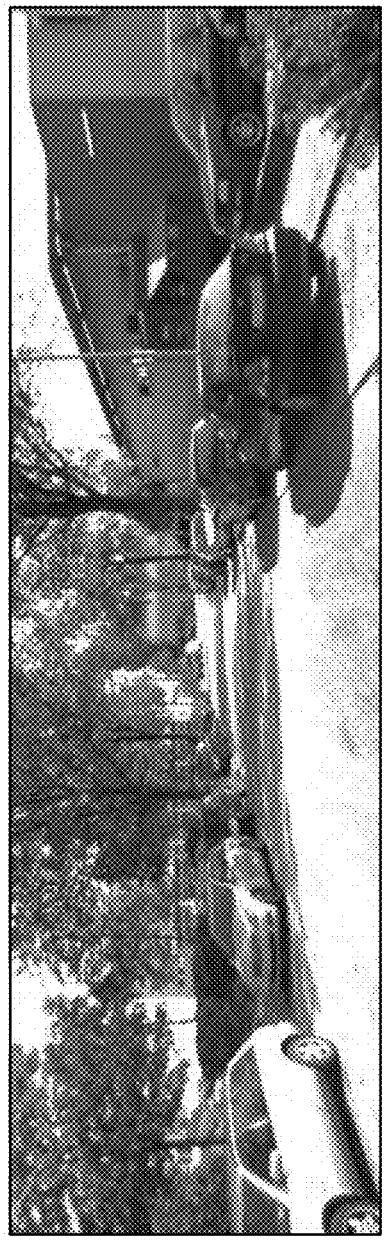
Figure 18:
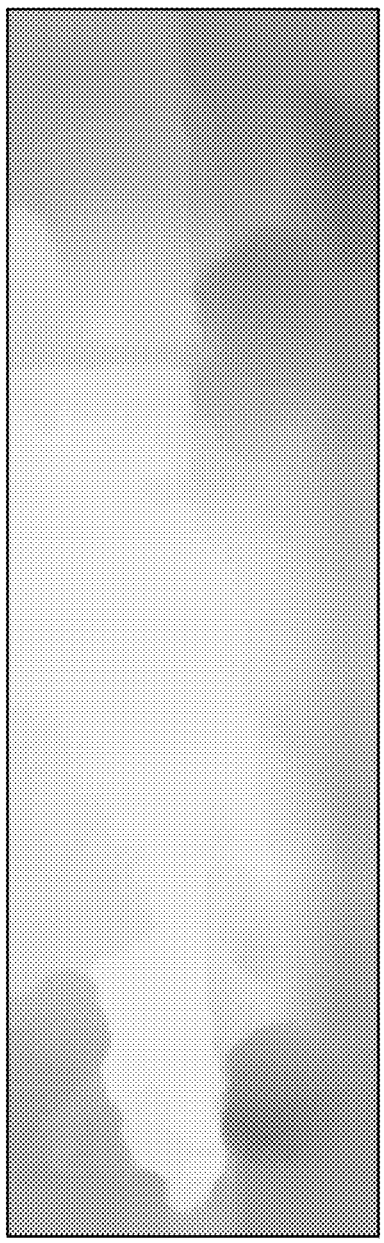
Figure 20:
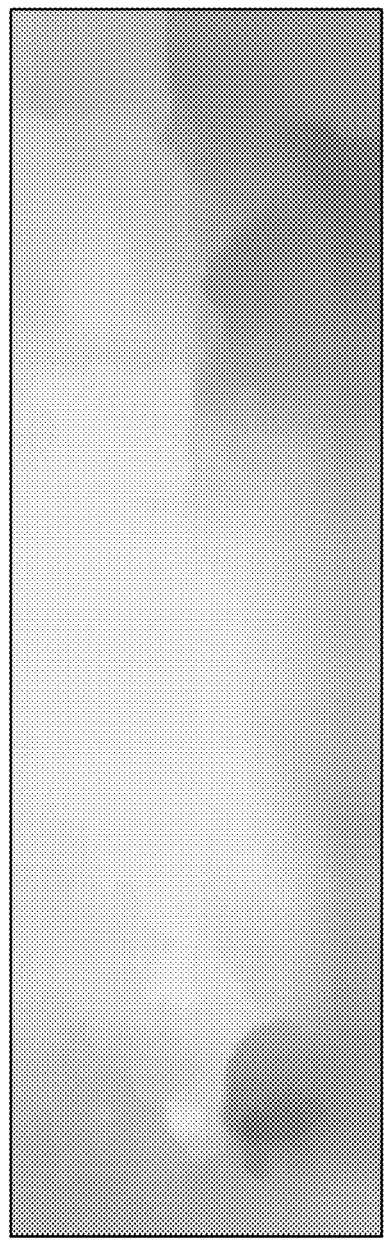

Nevertheless, the overall performance shown by MOT Accuracy (MOTA) is reasonably good in the virtual world, especially for the more flexible ODAMOT algorithm. In particular, the easier tracks and difficult failure cases are comparable between the real and virtual worlds, as measured by the MOT precision metric (MOTP). This similarity of behavior, which ensures the transferability of conclusions, is illustrated qualitatively in FIGS. 15 and 16 for the tracks. Note the visual similarity of both the scenes and the tracks. Heatmaps around detections may be used to show the overlaid particles of the individual trackers (shown in the FIGURES as dashed and solid boxes for ease of illustration). The similarity is also apparent in FIGS. 17-20 for the underlying optical flow measure "DeepFlow," which is used by ODAMOT, for matching frames of the original video and its synthetic clone. See P. Weinzaepfel, et al., "DeepFlow:

Large displacement optical flow with deep matching," ICCV, pp. 1385-1392, 2013. The narrowing gap between real and virtual worlds could be further reduced in practice by using more advanced computer graphics than the off-the-shelf Unity engine, e.g., by using tools from the movie industry.

"What-if" and "ceteris paribus" analysis in MOT: The last four rows of results in Table 1 shows the quantitative tracking results for the different conditions. These results quantify how much impact each condition has on the MOT performance, underlying the lack of robustness of the state-of-the-art object detectors used in ODAMOT, based on Regions with Convolutional Neural Network Features (R-CNN). See, R. Girshick, et al., "Rich feature hierarchies for accurate object detection and semantic segmentation," CVPR, pp. 580-587, 2014.

In particular, fog is shown as severely impacting recall, thus suggesting the need for specific training data for that scenario. Overall, the results suggest that although motion information is mostly preserved, appearance models break down, to some degree, due to the lack of diversity in the training data, including for different lighting and weather conditions.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of assessing video performance analysis comprising:
   with a camera, acquiring a first set of real-world data including a video sequence, the video sequence including visual components and objects;
   with at least one sensor, automatically generating a second set of real-world data including a set of physical measurements for the objects and visual components of the video sequence;
   with a computer graphics engine, cloning the first and second sets of real-world data in a virtual world, comprising:
      decomposing the visual components and objects in the video sequence of the first set of real-world data into at least one object category,
      populating the virtual world with virtual visual components and virtual objects,
      generating a script for controlling the virtual visual components and the virtual objects in the virtual world based on the acquired visual components and objects in the first set of real-world data and the automatically generated set of physical measurements for the objects and visual components in the second set of real-world data, and
      generating a synthetic clone of the video sequence based on the script for controlling the virtual visual components and the virtual objects;
   generating a set of ground truth annotations for the virtual objects in the synthetic clone;
   comparing the real-world data with the synthetic clone of the video sequence; and
   assessing a transferability of conclusions from the virtual world to the real-world based on the comparison of the real-world data with the synthetic clone of the video sequence.

2. The method of claim 1, wherein the acquiring the first and second sets of real-world data further comprises annotating the objects in an object category with the set of physical measurements from the at least one sensor, the at least one sensor including at least one of a global positioning system, an inertia measurement unit, an ultraviolet camera, and a 3D laser scanner, and wherein the camera includes at least one of a monochrome camera, a color camera, and an infrared camera.

3. The method of claim 2, wherein the annotating with the set of physical measurements includes annotating the objects with at least one of a position, size, inertia, and orientation of each of the objects in the at least one object category.

4. The method of claim 1, further comprising changing a condition of one of the virtual visual components or the virtual objects.

5. The method of claim 4, further comprising generating a modified synthetic video based on the changed condition and generating a set of ground truth annotations for the virtual objects in the modified synthetic video.

6. The method of claim 4, wherein the changing a condition includes changing a position, orientation, trajectory, size, color, or shape of at least one of the virtual objects.

7. The method of claim 4, wherein the changing a condition of one of the virtual visual components includes changing a lighting or a weather condition.

8. The method of claim 4, wherein the changing a condition includes manually adding, modifying or removing at least one of the virtual objects.

9. The method of claim 1, further comprising performing a specific task with an algorithm on the first and second sets of real-world data and performing the specific task with the algorithm on the synthetic clone of the video sequence.

10. The method of claim 9, further comprising evaluating the performance of the algorithm against the set of ground truth annotations for the virtual objects in the synthetic clone.

11. The method of claim 9, wherein the algorithm is for multi-object tracking.

12. The method of claim 5, further comprising performing a specific task with an algorithm on the modified synthetic video.

13. The method of claim 12, further comprising evaluating the performance of the algorithm against the set of ground truth annotations for the virtual objects the modified synthetic video.

14. The method of claim 12, wherein the algorithm is for multi-object tracking.

15. The method of claim 1, wherein the at least one object category is selected from a vehicle category, an animal category, a structure category, a signage category, and an environmental category.

16. A computer program product comprising a non-transitory recording medium storing instructions, which when executed on a computer, causes the computer to perform the method of claim 1.

17. A system comprising memory which stores instructions for performing the method of claim 1 and a processor in communication with the memory which executes the instructions.

18. A system for assessing video performance analysis comprising:
   a computer graphics engine component, which:
      clones first and second sets of real-world data in a virtual world, the first set of real-world data being acquired by a camera and including a video sequence having visual components and objects, the second set of real-world data being automatically generated by at least one sensor and including sensor data having a set of physical measurements for the objects and visual components of the video sequence,
  decomposes the visual components and objects in the video sequence of the first set of real world data into at least one object category, and
  populates the virtual world with virtual visual components and virtual objects;
a scripting component which:
  generates a script to control the virtual visual components and virtual objects in the virtual world based on the acquired visual components and objects in the first set of real-world data and the automatically generated sensor data for the objects and visual components in the second set of real-world data, and
  generates a synthetic video sequence clone;
a modification component for changing a condition of one of the virtual visual components and the virtual objects;
an annotation component for generating a set of ground truth annotations for the virtual objects;
a performance component for performing a specific task with an algorithm and assessing a transferability of conclusions based on a performance of the algorithm; and
a processor which implements the computer graphics engine component, the scripting component, the modification component, the annotation component, and the performance component.

19. The system of claim 18 further comprising a seeding component for annotating the first and second sets of real-world data, enabling the graphics engine component to initialize the virtual world.

20. A method of assessing video performance analysis comprising:
  acquiring a first set of real-world data with a camera, the first set of real-world data including a video sequence, the video sequence including visual components and objects;
  automatically generating a second set of real-world data with at least one sensor, the second set of real-world data including sensor data, the sensor data including a set of physical measurements for the objects and visual components of the video sequence;
  with a computer graphics engine, cloning the first and second sets of real-world data in a virtual world, comprising:
    decomposing the visual components and objects in the video sequence of the first set of real world data into at least one object category, and
    populating the virtual world with virtual visual components and virtual objects;
  generating a script for controlling the virtual visual components and the virtual objects in the virtual world based on the acquired visual components and objects in the first set of real-world data and the automatically generated sensor data for the objects and visual components in the second set of real-world data;
  changing a condition of one of the virtual visual components or the virtual objects;
  generating a synthetic clone of the video sequence based on the script for controlling the virtual visual components and the virtual objects;
  generating a modified synthetic video based on the changed condition;
  generating a set of ground truth annotations for the virtual objects in the synthetic clone and the virtual objects in the modified synthetic video;
  performing a specific task with an algorithm on the real-world data, on the synthetic clone of the video sequence, and on the modified synthetic video;
  evaluating a performance of the algorithm against the set of ground truth annotations; and
  assessing a transferability of conclusions from the virtual world to the real-world based on the performance of the algorithm.

* * * * *